Dec. 12, 1939.  W. P. MASON  2,183,123
WAVE FILTER
Filed June 11, 1934  7 Sheets-Sheet 1

INVENTOR
W. P. MASON
BY
G. H. Stevenson
ATTORNEY

Dec. 12, 1939. W. P. MASON 2,183,123
WAVE FILTER
Filed June 11, 1934 7 Sheets-Sheet 2

INVENTOR
W. P. MASON
BY
*G. H. Stevenson*
ATTORNEY

Dec. 12, 1939.  W. P. MASON  2,183,123

WAVE FILTER

Filed June 11, 1934  7 Sheets-Sheet 3

INVENTOR
W. P. MASON
BY
G. H. Stevenson
ATTORNEY

Dec. 12, 1939.  W. P. MASON  2,183,123
WAVE FILTER
Filed June 11, 1934  7 Sheets-Sheet 4

INVENTOR
W. P. MASON
BY
G. H. Stevenson
ATTORNEY

Dec. 12, 1939.  W. P. MASON  2,183,123
WAVE FILTER
Filed June 11, 1934   7 Sheets-Sheet 5

INVENTOR
W. P. MASON
BY
G. H. Stevenson
ATTORNEY

Dec. 12, 1939.  W. P. MASON  2,183,123
WAVE FILTER
Filed June 11, 1934   7 Sheets-Sheet 6

INVENTOR
W. P. MASON
BY
G. H. Stevenson
ATTORNEY

Dec. 12, 1939.   W. P. MASON   2,183,123
WAVE FILTER
Filed June 11, 1934   7 Sheets-Sheet 7

INVENTOR
W. P. MASON
BY
G. H. Stevenson
ATTORNEY

Patented Dec. 12, 1939

2,183,123

UNITED STATES PATENT OFFICE 2,183,123

WAVE FILTER

Warren P. Mason, West Orange, N. J., assignor to Bell Telephone Laboratories, Incorporated, New York, N. Y., a corporation of New York Application June 11, 1934, Serial No. 730,139

26 Claims. (Cl. 178—44)

This invention relates to broad band wave filters and more particularly to filters for use at very high frequencies of the order of ten megacycles per second and upward.

The principal object of the invention is the improvement of the transmission characteristic of filters intended to operate at very high frequency. Another object is to provide for high frequency filters a simple and inexpensive structure that is both mechanically stable and capable of accurate adjustment.

The ordinary type of filter construction using condensers and inductance coils has been found to be limited in its range of application to frequencies not greatly exceeding a few hundred thousand cycles per second. This is due mainly to the excessive energy dissipation in the inductance coils at higher frequencies which operates to reduce the sharpness of the cut-off at the band limits and to increase the transmission loss within the band. By the use of piezoelectric quartz crystals as impedance elements it has been possible to extend the range of broad band filters up to several megacycles per second and at the same time to retain a sharp cut-off characteristic coupled with a low loss in the transmission band. However, at higher frequencies the required crystal dimensions become very small and the difficulties of precise construction become insurmountable.

In accordance with the present invention broad band filters are provided for operation at frequencies of ten megacycles per second and upward by the use of uniform transmission lines, such as concentric conductor cables and Lecher wires, as the impedance elements of the filter network. Calculation and measurement have shown that the energy dissipation in lines of these types is very small and does not produce any serious loss in the transmission bands of wave filters using the lines as impedance elements. Moreover, since the impedance elements usually consist of lines of appreciable length, their dimensions are large enough to permit accurate adjustment and to provide mechanical stability.

In my earlier Patent No. 1,781,469, issued November 11, 1930, it is shown how regular combinations of uniform lines, either electrical or acoustic can be made to provide multiple band transmission characteristics. The present invention makes possible a substantial reduction in the lengths of the lines required by the use of condensers in combination with the line elements. By this means it is possible also in certain cases to eliminate the additional transmission bands thus providing a single band structure, and in other cases to relegate any additional bands to frequencies far removed from the desired band.

The nature of the invention will be more fully understood from the following detailed description and by reference to the accompanying drawings, of which:

Figs. 38, 41, 44, 47, 50, 53, 56, 59, 62, 65, 68, 71, 74, 77, 80, 83 and 86 show schematic diagrams of wave filters which embody the invention;

Figs. 39, 42, 45, 48, 51, 54, 57, 60, 63, 66, 69, 72, 75, 78, 81, 84 and 87 represent the approximate equivalent electrical circuits of the filters of Figs. 38, 41, 44, 47, 50, 53, 56, 59, 62, 65, 68, 71, 74, 77, 80, 83 and 86, respectively;

Figs. 40, 43, 46, 49, 52, 55, 58, 61, 64, 67, 70, 73, 76, 79, 82, 85 and 88 give typical attenuation characteristics of the filters shown respectively, in Figs. 38, 41, 44, 47, 50, 53, 56, 59, 62, 65, 68, 71, 74, 77, 80, 83 and 86;

Figure 1:
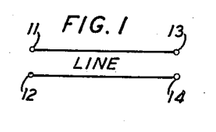
Figs. 1 and 4 represent uniform transmission lines respectively open-circuited and short-circuited at the remote end.

A portion of uniform transmission line of the type contemplated in accordance with the invention for use as a reactance element in a wave filter is shown diagrammatically in Fig. 1, in which the reference numerals 11, 12 indicate the input terminals and 13, 14 the output terminals. The line may be of the concentric conductor type, in which the outer conductor surrounds the inner one and is coaxial therewith. The inner conductor may be held in proper space relationship with respect to the outer by means of supports made of quartz or other suitable insulating material. Such a line has the advantages of mechanical stability, very low energy dissipation, and complete shielding whereby coupling between the several line elements is prevented.

Figure 2:
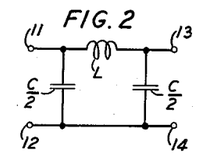
Figs. 2 and 5 are lumped electrical representations of the lines shown in Figs. 1 and 4, respectively.

A simple lumped electrical representation of a concentric conductor transmission line, holding for frequencies such that the line is less than one-quarter wave length, is shown schematically in Fig. 2, where the inductance L and the capacitance C represent, respectively, the total distributed inductance and capacitance of the section of line. For a length of line $l$ these quantities may be evaluated by means of the following expressions:

$$L = 2l \log_e \frac{b}{a} \times 10^{-9} \text{ henries} \quad (1)$$

$$C = \frac{5.55l \times 10^{-13}}{\log_e \frac{b}{a}} \text{ farads} \quad (2)$$

where
$a$=outside diameter of inner conductor.
$b$=inside diameter of outer conductor.

Figure 3:
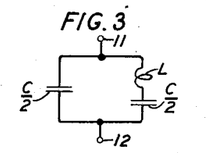
Figs. 3 and 6 give simplified diagrams for the circuits of Figs. 2 and 5, respectively.

Fig. 3 is the corresponding equivalent electrical circuit for the line shown in Fig. 1 when used as a two-terminal impedance element.

The concentric conductor transmission lines described above are appropriate for use as shunt impedance elements in unbalanced, ladder-type networks, but when the element is required for use as a series branch or in a lattice-type network it will be found more convenient to construct the line in the balanced form, comprising a pair of wires arranged physically in parallel with each other. Such a pair of wires when adapted to carry high frequency currents is sometimes referred to as Lecher wires. The simple lumped electrical representation of a balanced line of this type is the same as shown in Fig. 2 except that the inductance L is divided into two equal parts, one-half being removed to the other side of the line. In the case of the balanced line the values of L and C may be found from Equations 1 and 2 if $a$=diameter of conductor.
$b$=axial spacing between conductors.

Figure 4:
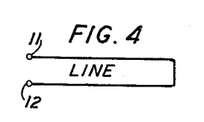
Figure 5:
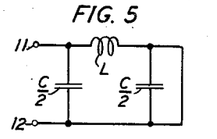
Figure 6:
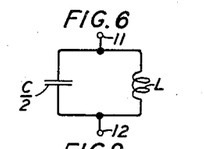

Fig. 4 represents a transmission line with its far end short-circuited. The approximate lumped impedance equivalent is given in Fig. 5, which reduces to the simplified circuit shown in Fig. 6.

Figure 7:
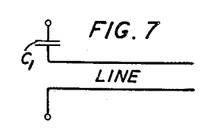
Figs. 7, 11, 15, 19, 23 and 27 show various combinations of transmission line and condenser in accordance with the invention.
Figure 8:
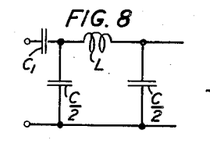
Figs. 8, 12, 16, 20, 24 and 28 are lumped electrical representations of the combinations shown in Figs. 7, 11, 15, 19, 23 and 27 respectively.
Figure 9:
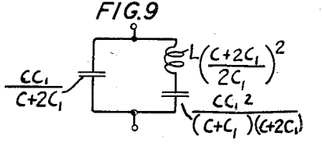
Figs. 9, 13, 17, 21 and 25 give simplified diagrams for the circuits of Figs. 8, 12, 16, 20 and 24, respectively.
Figure 10:
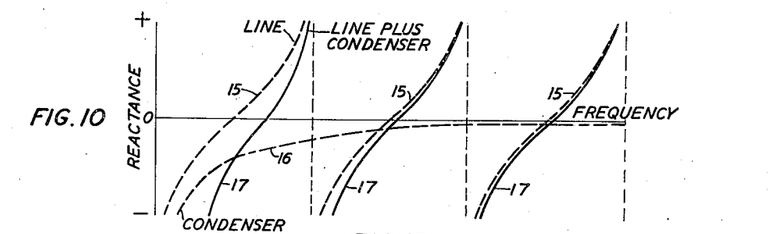
Figs. 10, 14, 18, 22 and 26 are typical rigorous reactance characteristics of the combinations shown in Figs. 7, 11, 15, 19 and 23, respectively.

In accordance with the invention there is contemplated the use of various combinations of transmission line and condenser such, for example, as those shown in Figs. 7, 11, 15, 19, 23 and 27. In Fig. 7 a condenser $C_1$ is connected in series with a line which is open at the distant end. The approximate equivalent lumped configuration is given in Fig. 8 which simplifies to the circuit of Fig. 9 when the redundant capacitance is eliminated. The rigorous reactance characteristic of the combination shown in Fig. 7 is given by Fig. 10, in which curve 15 represents the reactance of the line alone, curve 16 the condenser $C_1$, and curve 17 the reactance of the combination. The reactance $Z_0$ of an open-circuited uniform transmission line of length $l$ at any frequency $f$ may be found from the equation:

$$Z_0 = -j\sqrt{\frac{L}{C}} \cot 2\pi fl\sqrt{LC} \quad (3)$$

in which L and C have the same significance as in Equations 1 and 2. As shown by curve 15, the reactance of the line starts at zero frequency with an infinite negative value and becomes alternately resonant and anti-resonant at equally spaced frequencies. Since the inductance and capacitance are of a distributed character the section of line will have an infinite number of such critical frequencies, only a few of which are shown in the diagram. To find the reactance of the combination, given by the solid line curve 17, the reactance of the condenser is added to that of the line. The anti-resonant frequencies remain unchanged, but each resonant frequency of the line is moved upward, the amount of the shift becoming smaller and smaller as the frequency increases so that the reactance of the combination rapidly approaches that of the line alone.

Figure 11:
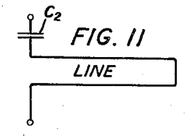
Figure 12:
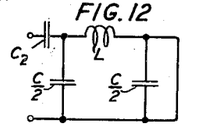
Figure 13:
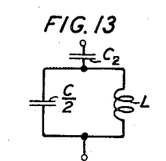
Figure 14:
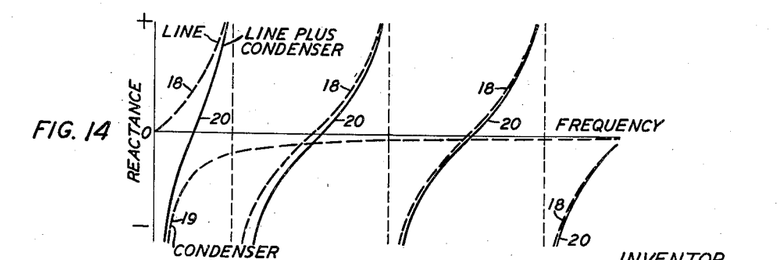

The combination of a condenser $C_2$ in series with a short-circuited line is shown in Fig. 11, the lumped equivalent circuit for which is given in Fig. 12 and the simplified diagram in Fig. 13. The rigorous reactance characteristic of the combination of Fig. 11 is represented by Fig. 14, where curves 18, 19 and 20 give the reactances, respectively, of the line, the condenser and the combination. The reactance $Z_s$ of a line short-circuited at its remote end is given by the expression $$Z_s = j\sqrt{\frac{L}{C}} \tan 2\pi fl\sqrt{LC} \quad (4)$$

As shown by curve 18 of Fig. 14, the characteristic of the short-circuited line starts at zero at zero frequency and passes alternately through equally spaced infinite and zero points as the frequency increases. The addition of the series condenser $C_2$ does not affect the anti-resonant frequencies but moves all of the resonant frequencies upward by diminishing amounts with increasing frequency, as indicated by the solid line curve 20. At the higher frequencies, it will be noted, the reactance of the combination rapidly approaches coincidence with the line characteristic, and the effect of the added condenser practically disappears.

Figures 15, 16, 17, 18:
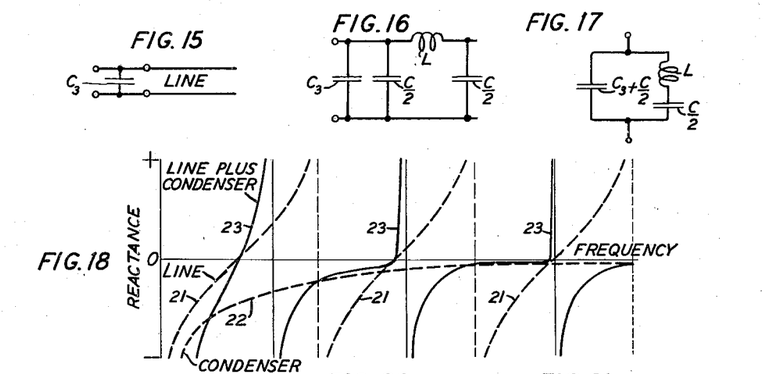

Fig. 15 shows a combination comprising a condenser $C_3$ shunted across the input terminals of a line, the remote end of which is open-circuited. The approximate lumped impedance equivalent of such a combination is given in Fig. 16, the simplified circuit in Fig. 17 and the complete reactance characteristic in Fig. 18. Curve 21 of Fig. 18 represents the reactance of the line, curve 22 the condenser $C_3$, and curve 23 the combination. The points of zero reactance are left unchanged, but the ranges in which the reactance of the system is positive become smaller and smaller as the frequency increases.

Figures 19, 20:
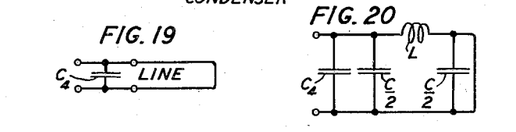
Figure 21:
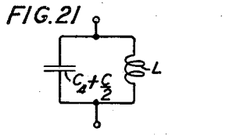
Figure 22:
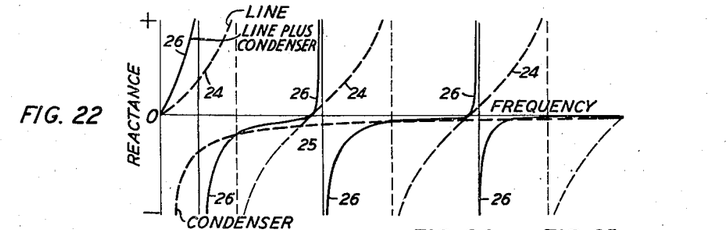

The combination of a condenser $C_4$ connected in parallel with a transmission line short-circuited at its distant end is shown diagrammatically in Fig. 19, the lumped equivalent circuit in Fig. 20, the simplified schematic in Fig. 21 and the reactance characteristic in Fig. 22. Curve 24 of Fig. 22 represents the reactance of the line, curve 25 the condenser $C_4$ and curve 26 the combination. It will be seen that the resonance frequencies of the line are unaffected but the anti-resonances are moved downward by progressively increasing amounts, and as a result the ranges in which the system is inductive become diminishingly small. At high frequencies the anti-resonances of the combination nearly coincide with the resonances of the line and the reactance approaches that of the condenser alone.

Figure 23:
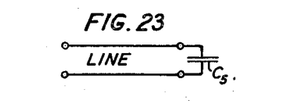
Figure 24:
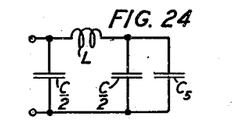
Figure 25:
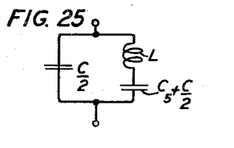
Figure 26:
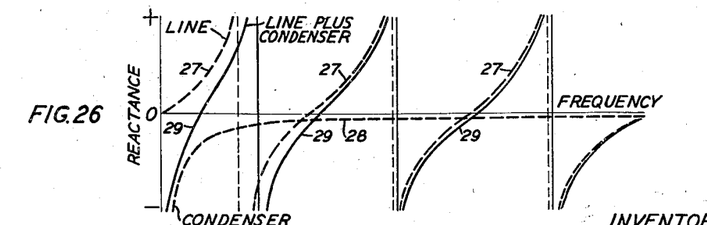

A line terminated at its far end in a condenser $C_5$ is shown in Fig. 23, the approximate lumped impedance equivalent is given in Fig. 24, the simplified circuit in Fig. 25 and the complete reactance characteristic in Fig. 26 where curve 27 represents the reactance of a short-circuited line, curve 28 the condenser, and curve 29 the reactance of the combination. The reactance $Z_c$ of the combination shown in Fig. 23 may be determined from the equation $$Z_c = -j\sqrt{\frac{L}{C}} \cot\left[\frac{2\pi fl}{\sqrt{LC}} - \frac{\pi}{2} + \alpha\right] \quad (5)$$

in which the angle $\alpha$ is found from the expression $$\cot \alpha = -2\pi fC_5 \sqrt{\frac{L}{C}} \quad (6)$$

As shown by curve 29 of Fig. 26, all of the critical frequencies of the line are shifted upward by amounts which become less as the frequency increases, and at the higher frequencies the impedance of the combination rapidly approaches that of the short-circuited line.

Figure 27:
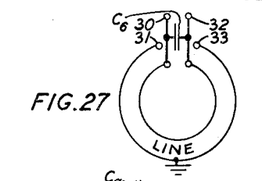
Figure 28:
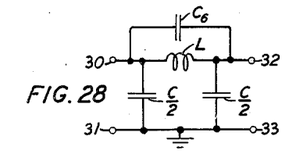

Fig. 27 shows how a condenser may be shunted around the line inductance L. The line, which is of the coaxial type having input terminals 30, 31 and output terminals 32, 33, is coiled into one or more loops so that an input terminal 30 is brought into close proximity with an output terminal 32 and the condenser $C_6$ is connected between these two terminals. The approximate lumped equivalent circuit is given in Fig. 28.

The filters of the invention described hereinafter are designed so as to have their desired transmission band at the lowest critical frequency of the line-condenser combination. This has the advantage that it is not necessary to use half-wave or quarter-wave lines, but lines as short as one-twelfth or less of the wave length corresponding to the mean band frequency may be employed.

A further advantage is that the nearest possible extra band may be relegated to a frequency which is from six to nine times the mean frequency of the desired band.

In the filter design calculations the harmonic resonances of the line may safely be ignored and the filter elements may be computed in accordance with Equations 1 and 2 when the desired band is located below the lowest critical frequency of the line. In other words, the filter design may proceed on the assumption that the line is accurately represented by its approximate lumped impedance equivalent given in Fig. 2.

In the matter of eliminating the undesired transmission bands in the filters designed in accordance with the invention there are two principles involved which may conveniently be discussed by reference to the equivalent lattice structure. Ordinarily it has been assumed that the critical frequencies of the line and diagonal branches of a symmetrical lattice should coincide in a particular manner in order to maintain single band transmission. In practice, however, it is known that exact coincidence is not necessary and that a considerable displacement is permissible. Theoretical bands exist when the critical frequencies do not coincide, but when the two reactance curves have nearly the same phase angle and the filter is terminated by resistances the reflection effects obliterate the irregularities. For a detailed explanation of this principle reference is made to E. L. Norton's copending application, Serial No. 729,743 filed June 9, 1934 which issued as U. S. Patent No. 2,070,677 February 16, 1937. In one group of filters this principle is used to eliminate undesired bands, the lattice branches being arranged so that approximate coincidence of the critical frequencies is obtained throughout the attenuating region. Filters representative of this group are shown in Figs. 29, 38, 41, 44, 47, 50, 53 and 56 and are described more fully hereinafter.

In a second group of filters the extra transmission bands are not eliminated but are made very narrow, the unwanted transmission bands appearing as fairly deep valleys in the attenuation characteristic. This group is represented by the filters shown in Figs. 33, 59, 62, 65, 68, 71 and 74, described below.

In a third group of filters, representative of which are those shown in Figs. 77, 80, 83 and 86, there are a plurality of well-defined transmission bands approximately harmonically spaced and all of about the same importance.

Figures 29, 31:
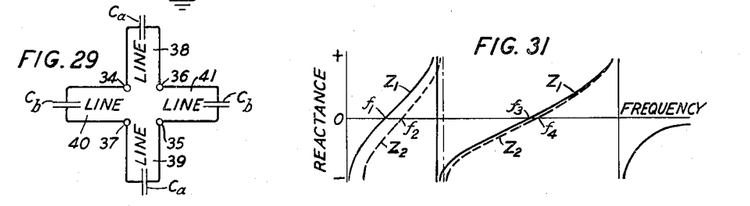
Figs. 29 and 33 show, respectively, a lattice-type and a ladder-type wave filter embodying the invention.
Fig. 31 gives typical exact reactance characteristics for the impedance branches of the filter shown in Fig. 29.
Figure 30:
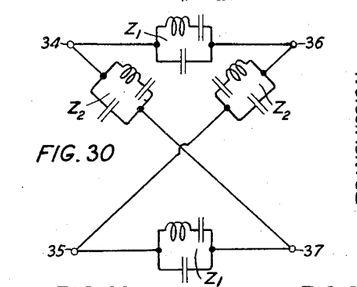
Figs. 30 and 34 are the approximate equivalent electrical circuits of the filters of Figs. 29 and 33 respectively.
Figure 32:
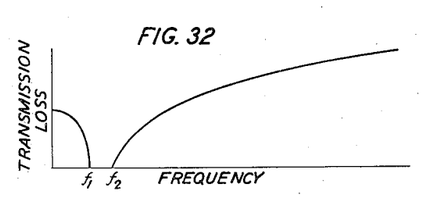
Figs. 32 and 37 are typical transmission characteristics for the filters of Figs. 29 and 33, respectively.

The wave filter shown schematically in Fig. 29 is typical of those falling within the first group mentioned above. The filter comprises four balanced uniform transmission lines of equal length, arranged to form a lattice network having a pair of input terminals 34, 35 and a pair of output terminals 36, 37 to which loads of suitable impedance may be connected. The series branches $Z_1$ of the network are formed by the two lines 38, 39 each terminated at the far end by a condenser $C_a$, and the diagonal branches are constituted by the two lines 40, 41 each terminated at its distant end by a condenser $C_b$. Fig. 30 shows the approximate equivalent lumped structure of the lattice network of Fig. 29. The solid line curve of Fig. 31 gives the complete reactance of the series branches and the dotted line curve represents that of the diagonal branches. According to well known filter theory, a transmission band will be formed between the two frequencies $f_1$ and $f_2$ where the two reactance characteristics are of opposite sign, as indicated by the transmission loss characteristic of Fig. 32. Theoretically, a second band will be formed in the narrow region between the frequencies $f_3$ and $f_4$ where the reactances are again of opposite sign, but as pointed out above all transmission bands except the principal one are obliterated by reflection effects when the reactances of $Z_1$ and $Z_2$ approximately coincide and have nearly the same phase angles and the filter is terminated by resistance loads. These extraneous bands, therefore, do not show up to any noticeable extent in the transmission characteristic of the filter. The points of cut-off $f_1$ and $f_2$ are controlled largely by the magnitudes of the terminating condensers $C_a$, $C_b$ and the larger these are made the lower will be the cut-off frequencies. As the pass band of the filter is lowered in frequency the tendency to diverge from a single band transmission characteristic becomes less. If the characteristic impedance of the series lines 38, 39 is made to differ somewhat from the characteristic impedance of the diagonal lines 40, 41 peaks of attenuation may be made to appear at selected frequencies where the reactance of $Z_1$ crosses the reactance of $Z_2$.

Figure 33:
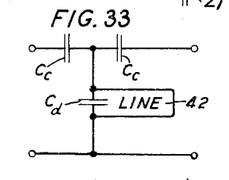
Figure 34:
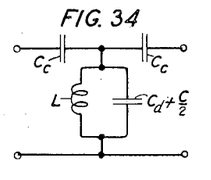
Figure 35:
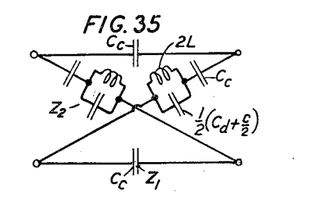
Fig. 35 represents the equivalent lattice structure of the network of Fig. 34.

The ladder-type filter shown schematically in Fig. 33 may be taken as a typical representative of the filters comprising the second group mentioned above. The series impedances consist of a pair of equal condensers $C_c$ and the shunt branch is made up of a condenser $C_d$ connected in parallel with a transmission line 42 which is short-circuited at its remote end. The approximate equivalent lumped structure is given in Fig. 34, in which L represents the distributed inductance and C the distributed capacitance of the line 42. The equivalent lattice configuration is represented by Fig. 35, where the line impedances $Z_1$ are the condensers $C_c$ and the diagonal branches $Z_2$ consist of a condenser $C_c$ in series with a loop comprising an inductance of value 2L in parallel with a second condenser of value $$\tfrac{1}{2}\left(C_d+\tfrac{C}{2}\right)$$

Figure 36:
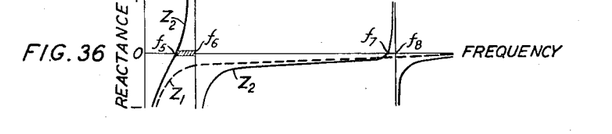
Fig. 36 gives typical exact reactance characteristics for the branches of the lattice network which is the rigorous equivalent of the filter shown in Fig. 33.
Figure 37:
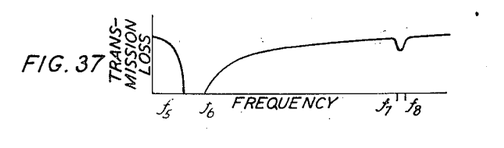

The reactance of $Z_1$ is given by the dotted line curve of Fig. 36 and the reactance of $Z_2$ by the solid line curve. The principal transmission band, as shown by the transmission loss characteristic of Fig. 37, will occur between the frequencies $f_5$ and $f_6$ where the two reactance characteristics are of opposite sign. Between the frequencies $f_7$ and $f_8$ the reactances are again opposite in sign and at this point there will appear a sharp dip in the loss characteristic. However, due to the narrowness of this band and the inherent energy dissipation in the component filter elements, the transmission characteristic is not impaired to any appreciable extent. The pass bands occurring at higher frequencies are even less noticeable in their effect upon the loss introduced by the filter and therefore may safely be ignored.

Figure 38:
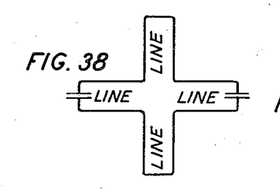
Figure 39:
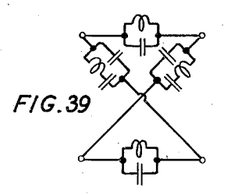
Figure 40:
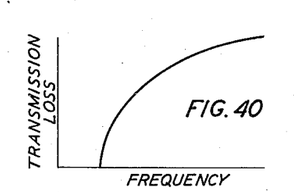

Returning again to group one, another example is given by the lattice type filter of Fig. 38 which is similar to the one shown in Fig. 29 except that the pair of lines which constitute the series impedance branches are short-circuited at the far end instead of being terminated in condensers. The approximate equivalent circuit is given in Fig. 39 and the transmission loss characteristic, which is of the low-pass type, is shown in Fig. 40. If the characteristic impedances of the series and diagonal lines are made to differ from each other, peaks of attenuation may be introduced.

Figures 41, 42:
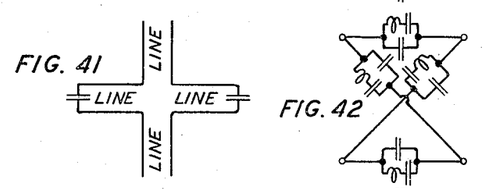
Figure 43:
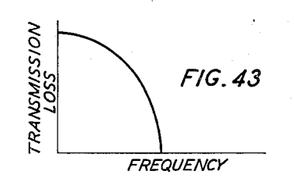

The filter shown in Fig. 41 is of the high-pass variety and differs from the one of Fig. 38 only in that the series lines are open-circuited at the distant end instead of being short-circuited. The approximate equivalent circuit and the transmission loss characteristic for this filter are given respectively in Figs. 42 and 43. Here, again, an attenuation peak may be introduced by making the characteristic impedances of the two sets of lines different so that there will be a crossing of the reactance characteristics of the series and diagonal branches at some frequency below the cut-off.

Figures 44, 47:
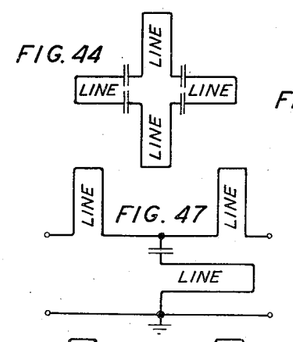
Figure 46:
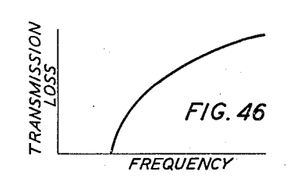
Figure 48:
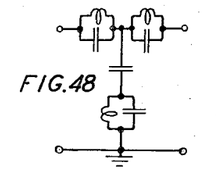
Figure 49:
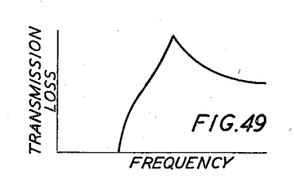
Figure 50:
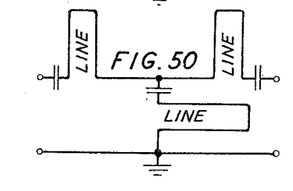
Figure 51:
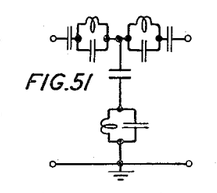
Figure 52:
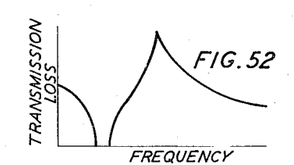
Figure 53:
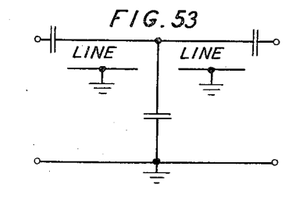
Figure 54:
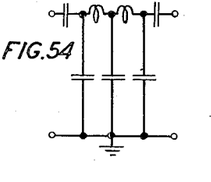
Figure 56:
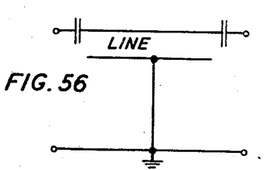
Figure 57:
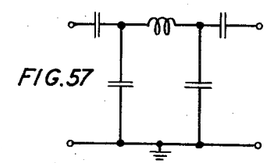
Figure 58:
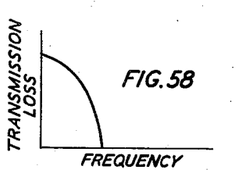
Figure 59:
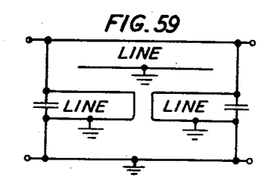
Figure 60:
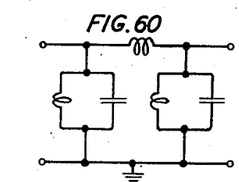
Figure 61:
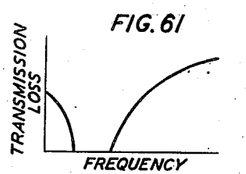
Figure 62:
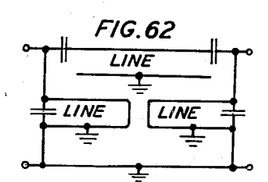
Figure 63:
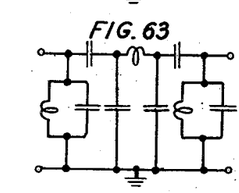
Figure 64:
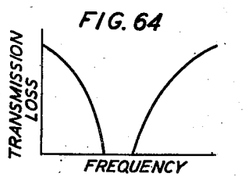
Figure 65:
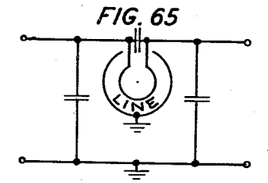
Figure 66:
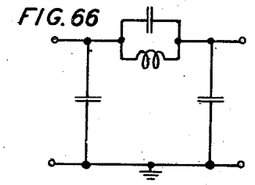
Figure 67:
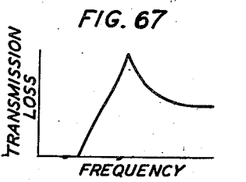
Figure 68:
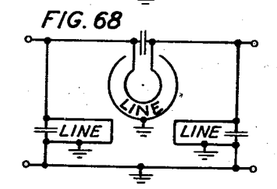
Figure 69:
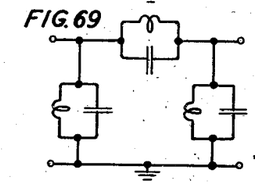
Figure 70:
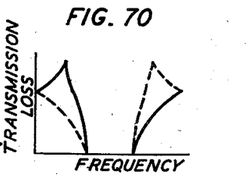
Figure 71:
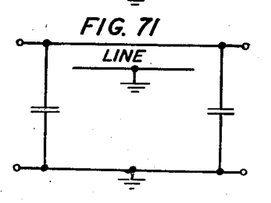
Figure 72:
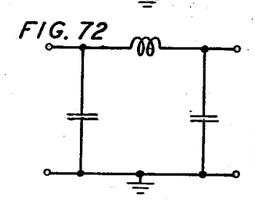
Figure 73:
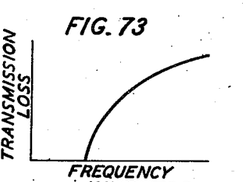
Figure 74:
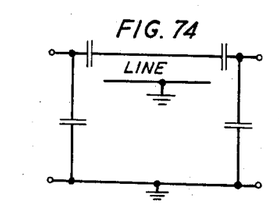
Figure 75:
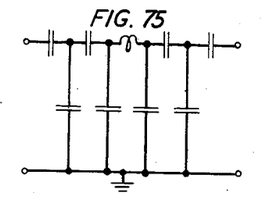
Figure 76:
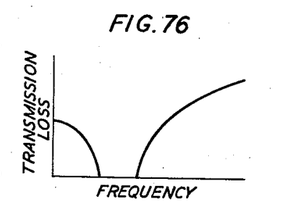

In the filter shown in Fig. 44 the impedance branches are transmission lines short-circuited at their distant ends, the diagonal branches having condensers connected in series therewith at their input ends. Fig. 45 gives the approximate equivalent structure and Fig. 46 the loss characteristic. The filter is of the low-pass type, and peaks of attenuation may be introduced, as explained above, by making the characteristic impedance of the series lines differ from that of the diagonal lines.

Ladder-type filters falling within group one are shown by Figs. 47, 50, 53, and 56, the approximate equivalent diagrams for which are given, respectively, by Figs. 48, 51, 54 and 57, and the transmission loss characteristics, respectively, by Figs. 49, 52, 55 and 58. The transmission lines which appear in the series impedance branches must be of balanced construction, while the lines forming a part of the shunt branches may be either of the balanced or concentric conductor type.

Additional examples of filters coming under group two are given in Figs. 59, 62, 65, 68, 71, and 74, the corresponding approximate equivalent lumped impedance representations being those shown respectively in Figs. 60, 63, 66, 69, 72 and 75, and the loss characteristics those represented by Figs. 61, 64, 67, 70, 73 and 76, respectively. In the case of the filter shown in Fig. 68, the loss characteristic obtainable is either the one shown by the solid-line curve of Fig. 70 or the one represented by the dotted-line curve, depending upon the choice of the critical frequencies of the series and shunt impedance branches.

Figure 77:
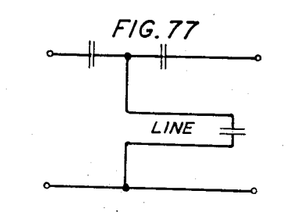
Figure 78:
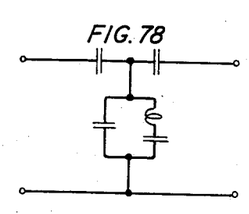
Figure 79:
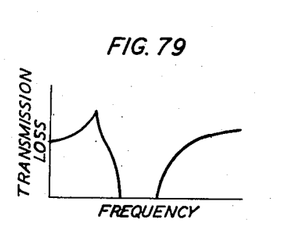

In a number of other filters designed in accordance with the invention there are a multiplicity of transmission bands of about the same importance, with approximately harmonic spacing. These comprise group three, mentioned above, of which the ladder-type filters shown in Figs. 77, 80, 83 and 86 are representative. In the filter of Fig. 77 the series impedances are a pair of equal condensers and the shunt branch consists of a transmission line terminated at the far end in a third condenser. The approximate equivalent circuit is given in Fig. 78 and the transmission loss characteristic in Fig. 79. The filter has a plurality of almost equally spaced pass bands, only the lowest of which is indicated in Fig. 79.

Figure 80:
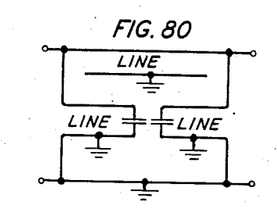
Figure 81:
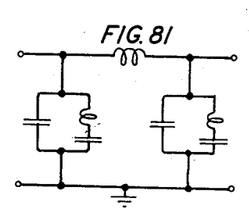
Figure 82:
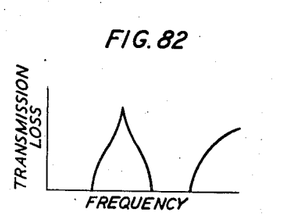

Fig. 80 shows a low-pass and band-pass filter, the approximate equivalent configuration of which is given in Fig. 81 and the loss characteristic in Fig. 82. Other harmonically spaced transmission bands will be present but only the first two appear in Fig. 82.

Figure 83:
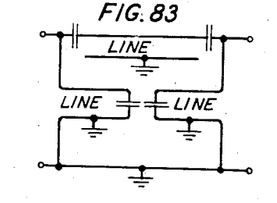
Figure 84:
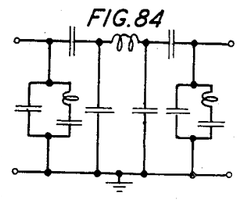
Figure 85:
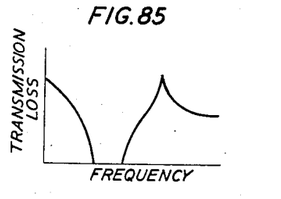

Another multi-band filter is shown in Fig. 83, the approximate equivalent lumped structure being given in Fig. 84 and the transmission loss characteristic in Fig. 85. The higher bands, which have approximately equal spacing, are not illustrated in Fig. 85.

Figure 86:
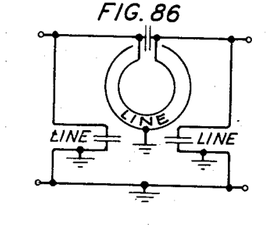
Figure 87:
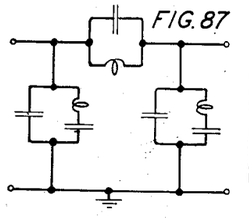
Figure 88:
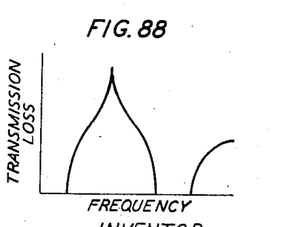

Fig. 86 shows another low- and band-pass filter, the equivalent lumped circuit of which is given in Fig. 87 and the loss characteristic in Fig. 88. Only the first two bands are shown but others will be present.

Figure 89:
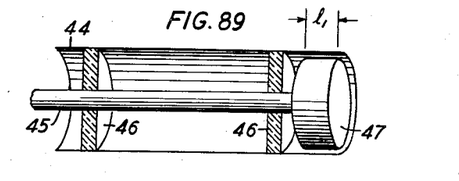
Figs. 89 and 90 are views, partly in section, showing the mechanical arrangement of a concentric conductor transmission line in combination, respectively, with a fixed and a variable shunt condenser.

Fig. 89 is a perspective view partly in section showing how, in accordance with the invention, a capacitance may be introduced in shunt with a concentric conductor transmission line. The line comprises an outer conductor 44 and a coaxial inner conductor 45 supported by means of the disk-shaped insulators 46 which may be made of quartz or other suitable material. At one end the inner conductor is expanded into a cylindrical portion 47 the outside diameter of which is only slightly less than the inside diameter of the outer conductor 44. The magnitude of the capacitance obtainable by this construction is limited by the fact that the length $l_1$ of the cylindrical portion 47 cannot exceed one-fourth of the wave length corresponding to the frequency at which the apparatus is to be used.

Figure 90:
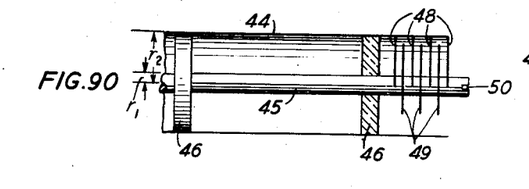
Figure 91:
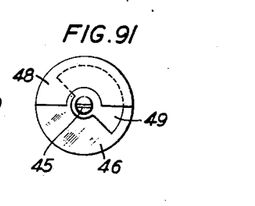
Fig. 91 is an end view of the variable condenser and line of Fig. 90.

For larger values, or if a variable capacitance is desired, resort may be had to the arrangement shown partly in section in Fig. 90, of which Fig. 91 is an end view. A number of semi-circular stator plates 48 are secured to the inside of the outer conductor 44, and a number of rotors 49 are mounted on the inner conductor 45 in such a way that they interleave with the stators when the inner conductor 45 is turned upon its bearings in the supports 46. A screw slot 50 is provided in the end of the inner conductor 45 to facilitate the rotary movement thereof. In this device it is necessary that the stators make good metallic contact with the outer conductor, and also that the rotors form a good contact with the inner conductor. Nearly a pure capacitance may be obtained so long as the difference between the radius $r_1$ of the inner conductor and the radius $r_2$ of the outer conductor does not exceed one-fourth wave length.

Figures 92, 93, 94, 95:
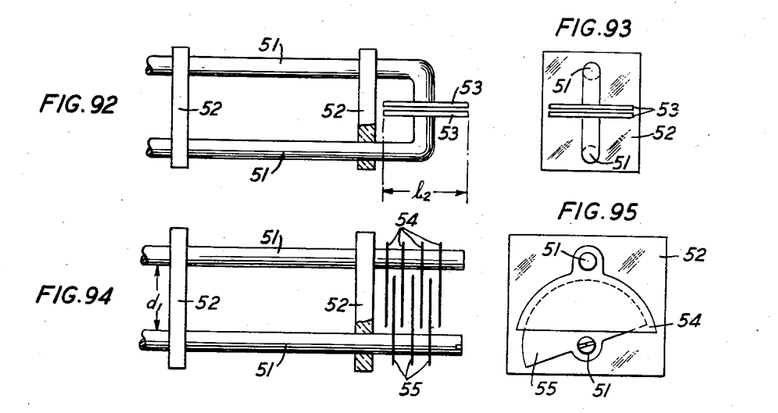
Figs. 92 and 94 are views partly in section showing, respectively, a fixed and a variable condenser in combination with a pair of Lecher wires.
Figs. 93 and 95 show end views of the mechanical arrangements of Figs. 92 and 94, respectively.

Fig. 92 is a view, partly in section, and Fig. 93 is an end view showing how a small, fixed capacitance may be added in shunt to a balanced transmission line comprising a pair of conductors 51 supported by the quartz insulators 52. At one end the conductors make a right-angle bend toward each other, and the two condenser plates 53 are attached to the ends of the respective conductors. This device will give a nearly pure capacitance provided the length $l_2$ is less than one-half wave length.

In Fig. 94 is shown, partly in section, a view of an arrangement whereby a variable shunt capacitance of large magnitude may be associated with a balanced line. Fig. 95 is an end view. A number of stator plates 54 are mounted upon one of the conductors 51 and a plurality of rotor plates 55 are mounted upon the other conductor so that the two sets of plates interleave with each other. The conductor which carries the rotors is arranged so that it may be turned in its bearings in the quartz blocks 52, thus permitting an angular displacement of the rotors with respect to the stators. This device will provide a substantially pure capacitance if the distance $d_1$ between the two conductors does not exceed one-fourth wave length.

Figure 96:
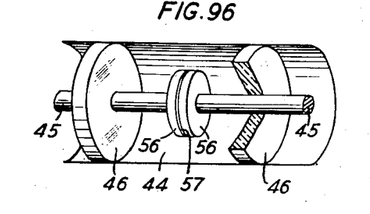
Figs. 96 and 97 are perspective views, partly in section, showing a concentric conductor line in series, respectively, with a fixed and a variable condenser.

The perspective view of Fig. 96, partly in section, shows how a small capacitance may be introduced in series in a concentric conductor line. The inner conductor 45 is severed and two metallic discs 56 are fastened, respectively, to the two ends thus made available. The two discs are brought close together and a thin quartz spacer 57 is inserted therebetween. For this use, quartz has the advantages that it may be ground to wafer thinness, has a good dielectric constant and low energy dissipation.

Figure 97:
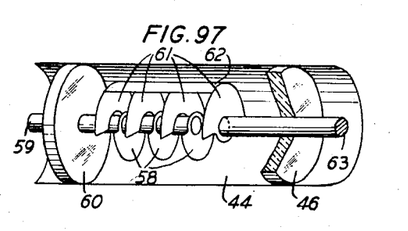

If larger series capacitances are required, or if it is desired to provide a variable capacitance, resort may be had to the arrangement shown in Fig. 97, a perspective view partly in section. A number of rotor plates 58 are mounted upon one portion 59 of the inner conductor which is arranged to rotate in its bearing in the insulator 60, while the stator plates 61 are maintained in the proper space relationship by means of the supporting member 62, the last stator being fastened to the end of another portion 63 of the inner conductor.

What is claimed is:

1. A broad band wave filter section comprising two reactive impedance branches the impedances of which vary in different manners with frequency whereby a transmission band is provided, one of said branches comprising a section of uniform and substantially dissipationless transmission line having harmonically spaced critical frequencies in series with a capacity, said capacity being so large in magnitude that its impedance is low compared to the characteristic impedance of said line at the critical frequencies of said line above the lowest, whereby a critical frequency is provided for said line-condenser combination at a frequency below the lowest critical frequency of said line while at the higher frequencies the impedance of the said line-condenser combination rapidly approaches the impedance of one of said component elements, and the impedance of said other branch being proportioned with respect to the impedance of said first-mentioned branch to provide a transmission band in a frequency range below the lowest critical frequency of said transmission line and to substantially prevent the formation of additional transmission bands at the higher critical frequencies of said line.

2. A wave filter of the ladder type comprising an impedance branch in series with the direction of wave propagation and an impedance branch in shunt therewith, one of said branches comprising a section of uniform transmission line having harmonically spaced critical frequencies in series with a capacity, said section of line being short-circuited at its far end and said capacity being so large in magnitude that its impedance is low compared to the characteristic impedance of said line at the critical frequencies of said line above the lowest, whereby a critical frequency is provided for said line-condenser combination at a frequency below the lowest critical frequency of said line, and the impedance of said other branch being proportioned with respect to the impedance of said first-mentioned branch to provide a transmission band in a frequency range below the lowest critical frequency of said transmission line.

3. A wave filter comprising two impedance branches the reactances of which by their ratio determine the transmission characteristics of said filter, one of said branches comprising a section of uniform transmission line having harmonically spaced critical frequencies in series with a capacity, said capacity being so large in magnitude that its impedance is low compared to the characteristic impedance of said line at the critical frequencies of said line above the first, and the impedance of said other branch being proportioned with respect to the impedance of said first-mentioned branch to provide a single transmission band for said filter.

4. A broad band wave filter comprising two impedance branches having reactive impedances of different frequency characteristics which by their ratio determine the transmission characteristics of the filter, one of said branches comprising a condenser in series with a section of uniform and substantially dissipationless transmission line having harmonically spaced critical frequencies, the impedance of said condenser being low relative to the impedance of said line at the critical frequencies of said line above the first, and the impedance of said other branch being proportioned with respect to the impedance of said first-mentioned branch to provide a single transmission band at the first critical frequency of said line-condenser combination.

5. A broad band wave filter comprising two impedance branches having reactive impedances of different frequency characteristics which by their ratio determine the transmission characteristics of the filter, one of said branches comprising a condenser in series with a section of uniform and substantially dissipationless transmission line having harmonically spaced critical frequencies, the impedance of said condenser being low relative to the impedance of said line at the critical frequencies of said line above the first, and the impedances of said two branches having critical frequencies above the first which are substantially coincident, whereby there is provided a single transmission band.

6. A broad band wave filter comprising two impedance branches having reactive impedances of different frequency characteristics which by their ratio determine the transmission characteristics of the filter, one of said branches comprising a condenser in series with a section of uniform and substantially dissipationless transmission line having harmonically spaced critical frequencies, the impedance of said condenser being low compared to the impedance of said line at the critical frequencies of said line above the first, whereby there is provided in said line-condenser combination a resonant frequency below the first critical frequency of said line while at the higher frequencies the impedance of said combination rapidly approaches the impedance of said line alone, and the impedance of said other branch being proportioned with respect to the impedance of said first-mentioned branch to provide a single transmission band at the first critical frequency of said line-condenser combination.

7. A broad band wave filter of the ladder type comprising a series impedance branch and a shunt impedance branch, one of said branches comprising a condenser in series with a section of uniform transmission line of the type having harmonically spaced critical frequencies, said line being short-circuited at one end, the impedance of said condenser being low relative to the impedance of said line at the critical frequencies of said line above the first, whereby there is provided for said line-condenser combination a critical frequency below the first critical frequency of said line while the higher critical frequencies of said combination tend to coincide with the critical frequencies of said line alone as the frequency increases, and the impedance of said other branch being proportioned with respect to the impedance of said first-mentioned branch to provide a single principal transmission band.

8. An electric wave filter comprising a wave transmission line of recurrent structure including series and shunt elements with impedance versus frequency characteristics so proportioned with respect to each other that a band pass characteristic will be obtained at certain desired frequencies in which the series elements consist of condensers and the shunt elements each consist of a condenser in series with a portion of transmission line short circuited at its far end and cut to a length a small fraction of a quarter wave length for the range of frequencies at which it is desired to operate said filter.

9. An electric wave filter comprising a wave transmission line of recurrent structure, the recurrent sections being composed of series and shunt elements of which the shunt elements are capacitors and the series elements are short loops of transmission line considerably less than one-quarter wave-length long for the frequencies at which it is desired to operate the wave filter, and the impedance versus frequency characteristics of the series and shunt elements being such with respect to each other that a band pass characteristic is obtained for certain frequencies.

10. A broad band wave filter section comprising two impedance branches having reactive impedances of different frequency characteristics which by their ratio determine the transmission characteristics of the filter, one of said branches comprising a section of uniform and substantially dissipationless transmission line having harmonically spaced critical frequencies in combination with a capacity, in which the capacity is connected in series with the line section.

11. A broad band wave filter section comprising a series impedance branch and a shunt impedance branch, said series branch comprising a condenser, said shunt branch comprising a second condenser connected in series with a section of uniform transmission line, and the impedances of said branches having frequency characteristics so proportioned with respect to each other that the filter will transmit a certain desired band of frequencies.

12. A broad band wave filter section comprising a series impedance branch and a shunt impedance branch, said series branch comprising a section of uniform transmission line, said shunt branch comprising a condenser connected in series with a second section of uniform transmission line, and the impedances of said branches having frequency characteristics so proportioned with respect to each other that the filter will transmit a certain desired band of frequencies.

13. A broad band wave filter section in accordance with claim 12 in which each of said sections of transmission line is short-circuited at its distant end.

14. A broad band wave filter section comprising a series impedance branch and a shunt impedance branch, each of said impedance branches comprising a section of uniform transmission line in combination with a condenser, and the impedances of said branches having frequency characteristics so proportioned with respect to each other that the filter will transmit a certain desired band of frequencies.

15. A wave filter section comprising a series impedance branch and a shunt impedance branch, said series branch comprising a section of uniform transmission line in combination with a condenser, and the impedances of said branches having frequency characteristics so proportioned with respect to each other that the filter will transmit a certain desired band of frequencies.

16. An electrical wave filter comprising a series impedance branch and a shunt impedance branch, said series branch consisting of a section of uniform transmission line short-circuited at its distant end, said shunt branch comprising a condenser, and the impedances of said branches having frequency characteristics so proportioned with respect to each other that the filter will transmit a certain desired band of frequencies.

17. A filter section in accordance with claim 14 in which the section of line and condenser in one of said impedance branches are connected in series.

18. A filter section in accordance with claim 14 in which in each of said impedance branches the component section of line and condenser are connected in series.

19. A filter section in accordance with claim 14 in which in each of said impedance branches the component section of line and condenser are connected in series and each of said sections of line is short-circuited at its far end.

20. A filter section in accordance with claim 15 in which said section of line and said condenser are connected in series.

21. A filter section in accordance with claim 15 in which said shunt impedance branch includes a second condenser.

22. A filter section in accordance with claim 15 in which said shunt impedance branch includes a second section of uniform transmission line.

23. A filter section in accordance with claim 15 in which said section of line and said condenser are connected in series and said shunt impedance branch includes a second condenser.

24. A filter section in accordance with claim 15 in which said section of line and said condenser are connected in series and said shunt impedance branch includes a second section of uniform transmission line.

25. A wave filter comprising a series impedance branch and a shunt impedance branch, said shunt branch comprising a section of uniform transmission line and a condenser connected in series, and the impedances of said branches having frequency characteristics so proportioned with respect to each other that the filter will transmit a certain desired band of frequencies.

26. A wave filter comprising two impedance branches having reactive impedances of different frequency characteristics which by their ratio determine the transmission characteristics of the filter, each of said impedance branches comprising a section of uniform transmission line in combination with a condenser, and the frequency characteristics of said branches being so proportioned with respect to each other that the filter will transmit a certain desired band of frequencies.

WARREN P. MASON.